United States Patent
Chowdhry et al.

(10) Patent No.: US 7,332,565 B2
(45) Date of Patent: Feb. 19, 2008

(54) METHOD FOR THE REDUCTION OF THE RESIDUAL MONOMER CONTENT IN AQUEOUS POLYMER DISPERSIONS

(75) Inventors: Mubarik Mahmood Chowdhry, Strasbourg (FR); Wolfgang Gaschler, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 155 days.

(21) Appl. No.: 10/552,994

(22) PCT Filed: Apr. 13, 2004

(86) PCT No.: PCT/EP2004/003848

§ 371 (c)(1),
(2), (4) Date: Oct. 13, 2005

(87) PCT Pub. No.: WO2004/092226

PCT Pub. Date: Oct. 28, 2004

(65) Prior Publication Data

US 2006/0205851 A1    Sep. 14, 2006

(30) Foreign Application Priority Data

Apr. 15, 2003   (DE) .............................. 103 17 434

(51) Int. Cl.
*C08F 6/00* (2006.01)
(52) U.S. Cl. .................. 528/480; 524/457; 524/458; 524/556; 524/557; 528/485; 528/560; 528/561
(58) Field of Classification Search ............... 524/457, 524/458, 556, 557; 528/560, 561, 480, 485
See application file for complete search history.

(56) References Cited

U.S. PATENT DOCUMENTS

| 4,529,753 | A | 7/1985 | Taylor |
| 5,087,676 | A | 2/1992 | Heider et al. |
| 5,994,457 | A | 11/1999 | Stanger et al. |
| 6,365,709 | B1 | 4/2002 | Heibel et al. |
| 6,433,132 | B1 | 8/2002 | Wood et al. |
| 6,444,760 | B1 | 9/2002 | Rupaner et al. |
| 6,444,785 | B1 | 9/2002 | Gotsche et al. |

FOREIGN PATENT DOCUMENTS

| DE | 37 18 520 | 12/1988 |
| DE | 38 34 734 | 4/1990 |
| DE | 42 32 194 | 3/1994 |
| DE | 195 29 599 | 2/1997 |
| DE | 197 41 187 | 3/1999 |
| DE | 198 39 199 | 3/2000 |
| DE | 198 40 586 | 3/2000 |
| EP | 0 003 957 | 9/1979 |
| EP | 0 028 348 | 5/1981 |
| EP | 0 563 726 | 10/1993 |
| EP | 0 764 699 | 3/1997 |
| EP | 0 767 180 | 4/1997 |
| WO | 95/33775 | 12/1995 |

*Primary Examiner*—Terressa Boykin
(74) *Attorney, Agent, or Firm*—Oblon, Spivak, McClelland, Maier & Neustadt, P.C.

(57) ABSTRACT

A method for reducing the amount of residual monomer in aqueous polymer dispersions by aftertreatment with an initiator system comprises aftertreating the aqueous polymer dispersion with addition of an initiator system essentially comprising
a) from 0.001 to 5% by weight, based on the total monomer amount used to prepare the polymer dispersion, of an inorganic salt of persulfuric acid,
b) from 0.005 to 5% by weight, based on the total monomer amount used to prepare the polymer dispersion, of a methyl ketone, and
c) optionally, catalytic amounts of a metal ion which is able to exist in a plurality of valence states.

8 Claims, No Drawings

METHOD FOR THE REDUCTION OF THE RESIDUAL MONOMER CONTENT IN AQUEOUS POLYMER DISPERSIONS

This application is a 371 of PCT/EP04/03848 filed Apr. 13, 2004.

DESCRIPTION

The invention relates to a method for reducing the amount of residual monomer in aqueous polymer dispersions by chemical aftertreatment with a special catalyst system.

Following their preparation by free-radically initiated polymerization or copolymerization of ethylenically unsaturated monomers, aqueous polymer dispersions comprise, besides a polymer solids fraction of from 30 to 75% by weight, owing to incomplete polymerization of the ethylenically unsaturated monomers used in the course of the free-radical main polymerization, which is generally taken to a monomer conversion of 95% and preferably from 98 to 99% by weight, an unwanted fraction of unpolymerized, free ethylenically unsaturated monomers as well ("residual monomers"). For reasons mostly of toxicology the market requires aqueous polymer systems having a low residual monomer content in combination with consistent processing properties and performance properties.

Besides nonchemical methods, such as inert gas stripping or steam stripping, a very wide variety of chemical methods is available, as described for example in EP-B 003 957, EP-B 028 348, EP-B 563 726, EP-A 764 699, US-A 4 529 753, DE-A 37 18 520, DE-A 38 34 734, DE-A 42 32 194, and DE-A 195 29 599, for lowering residual monomer contents of aqueous polymer dispersions.

For the use of carbonyl compounds and/or their reaction products in the aftertreatment of aqueous polymer dispersions it is necessary to proceed on the basis of the following prior art.

According to WO 95/33775 it is possible for the aftertreatment of aqueous polymer dispersions to use redox systems whose reducing agent comprises an adduct of hydrogensulfite anion and a ketone having 3 to 8 carbon atoms and/or the conjugate acid of this adduct. The aftertreatment is performed in the presence of metal compounds which are soluble in the aqueous medium.

EP-A 767 180 recommends reducing residual monomer contents using a redox initiator system composed of organic hydroperoxides which are soluble in water only very sparingly, if at all, and, inter alia, adducts of aldeyhydes with a carbon chain having 4 to 6 carbon atoms and bisulfites.

DE-A 19741187 discloses for chemical residual monomer removal a system composed of an oxidizing agent and an organic α-hydroxycarboxylic acid.

In DE-A 19839199 the use of oxidizing agents in combination with a system composed of an aldehyde and an inorganic dithionite is recommended for the depletion of residual monomers.

According to DE-A 19840586 it is possible for aftertreating aqueous polymer dispersions to use redox systems which are composed of hydrogen peroxide and/or a hydroperoxide and an α-hydroxycarbonyl compound.

It is an object of the present invention to provide a new, effective method for reducing the amount of residual monomer in aqueous polymer dispersions which allows in particular the organic components to be removed again simply from the aqueous polymer dispersion following the removal of residual monomer.

We have found that this object is achieved, and that the amount of residual monomer in aqueous polymer dispersions can be effectively reduced, if the aftertreatment of the aqueous polymer dispersions comprising residual monomer is carried out with the addition of an initiator system essentially comprising a) from 0.001 to 5% by weight, based on the total monomer amount used to prepare the polymer dispersion, of an inorganic salt of persulfuric acid, b) from 0.005 to 5% by weight, based on the total monomer amount used to prepare the polymer dispersion, of a methyl ketone, and c) optionally, catalytic amounts of a metal ion which is able to exist in a plurality of valence states.

Suitable inorganic salts of persulfuric acid are in principle all salts having a solubility >10 g/l in aqueous systems. Particular preference, however, is given to ammonium, potassium and/or sodium persulfate. It is of course also possible to use mixtures of aforementioned compounds.

The amount of inorganic persulfate added is usually in the range from 0.001 to 5% by weight, often from 0.002 to 3% by weight or from 0.003 to 2% by weight, frequently from 0.01 to 1.5% by weight or from 0.02 to 1% by weight, based in each case on the total monomer amount used for the polymerization.

As the methyl ketone it is possible to use any methyl ketones having a solubility of >1 g/l in water at 20° C. Particularly suitable methyl ketones are those compounds of the formula

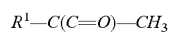

$$R^1—C(C\!=\!O)—CH_3$$

where $R^1$ is a $C_1$ to $C_5$ alkyl group, for example, a methyl, ethyl, n-propyl, isopropyl, n-butyl, 1-methylpropyl, 2-methylpropyl, tert-butyl, n-pentyl, 1-methylbutyl, 2-methylbutyl, 3-methylbutyl, 1-ethylpropyl, 2-ethylpropyl, 1,2-dimethylpropyl, 1,1-dimethylpropyl or 2,2-dimethylpropyl group. Often $R^1$ is a methyl, ethyl, n-propyl, isopropyl, n-butyl or tert-butyl group. Frequently $R^1$ is a methyl, ethyl, n-propyl or isopropyl group, in particular a methyl or ethyl group, preferably a methyl group. These $C_1$ to $C_5$ alkyl groups can also be substituted by other functional groups, examples being halogens, such as fluorine, chlorine, bromine or iodine, alkoxy groups —O—$R^2$, where $R^2$ corresponds to an unsubstituted $C_1$ to $C_5$ alkyl group as per $R^1$, or $R^1$ can be olefinically unsaturated, examples being 1-propenyl, 2-propenyl, isopropenyl, 1-butenyl, 2-butenyl, 3-butenyl, 1-methyl-1-propenyl, 1-methyl-2-propenyl, 2-methyl-1-propenyl, 2-methyl-1-propenyl, 1-pentenyl, 2-pentenyl, 3-pentenyl, 4-pentenyl, 1-methyl-1-butenyl, 1-methyl-2-butenyl, 1-methyl-3-butenyl, 2-methyl-1-butenyl, 2-methyl-2-butenyl, 2-methyl-3-butenyl, 3-methyl-1-butenyl, 3-methyl-2-butenyl, 3-methyl-3-butenyl, 1-ethyl-1-propenyl, 1-ethyl-2-propenyl, 2-ethyl-1-propyl-, 2-ethyl-2-propenyl, 1,2-dimethyl-1-propenyl, 1,2-dimethyl-2-propenyl, 1,1-dimethyl-1-propenyl or 2,2-dimethyl-1-propenyl group. It is of course also possible to use mixtures of aforementioned compounds.

The amount of added methyl ketone is usually in the range from 0.005 to 5% by weight, frequently from 0.01 to 3% by weight or from 0.03 to 2% by weight, and often from 0.05 to 1% by weight, based in each case on the total monomer amount used for the polymerization. Larger amounts of methyl ketone are also possible but generally make no sense economically.

The metal compounds which can be used optionally are advantageous for the aftertreatment. They are usually soluble completely in the aqueous medium of the polymer dispersion and their metallic component, moreover, is capable of existing in a plurality of valence states. The dissolved metal ions have a catalytic action and possibly support electron transfer reactions between the inorganic persulfates and the methyl ketones. Examples of dissolved metal ions suitable in principle include iron, copper, manganese, vanadium, nickel, cobalt, titanium, cerium, chromium and/or silver ions. It is of course also possible to use mixtures of different metal ions which do not interfere with one another, such as the $Fe^{2/3+}/VSO_4^-$ system, for example. Preference is given to using iron ions and/or silver ions. When using silver ions a further advantage is that the aqueous polymer dispersion is also provided with antibacterial properties.

The dissolved metal ions are used in catalytic amounts, usually in the range from 1 to 1000 ppm, often from 5 to 500 ppm, and frequently from 10 to 100 ppm, based in each case on the total monomer amount used for the polymerization. It is advantageous if the major amount, i.e., $\geq 50\%$ by weight, $\geq 60\%$ by weight, $\geq 70\%$ by weight, $\geq 80\%$ by weight, $\geq 90\%$ by weight, or even the total amount of the metal ions is added to the aqueous polymer dispersion before the initiator system consisting of persulfate and methyl ketone.

For the aftertreatment of the aqueous polymer dispersion, which has been heated to from about 50 to 130° C., preferably from 60 to 120° C., and more preferably from 80 to 100° C., the components of the initiator system used in accordance with the invention are advantageously metered in gradually, simultaneously or in succession, with stirring, preferably under atmospheric pressure, where appropriate alternatively at a pressure of greater than or less than 1 bar (absolute). In the case of metered addition in succession it is preferred to add the persulfate first. Particularly favorable is the simultaneous metered addition of persulfate and methyl ketone by way of two separate feeds. In that case the initiator components can be added, for example, from above, from below or through the side of the reactor. Preferably, however, the initiator system is metered in from below. Since the optimum duration of the initiator feed is dependent on the monomer composition, the size of the reaction mixture, and the reactor geometry, it is advantageous to determine it in preliminary tests. As a function of the task at hand, the addition of initiator may be made over a few seconds or over several hours.

The aftertreatment is normally conducted at a pH $\leq 10$. To adjust the pH of the polymer dispersion it is possible in principle to use bases, such as sodium hydroxide solution, aqueous ammonia or triethanolamine, etc. For the aftertreatment of the polymer dispersion a pH range of $\geq 2$ and $\leq 10$ is advantageous, but a pH of between $\geq 6$ and $\leq 8$ is preferred, and in the case of aqueous XSB dispersions a preferred pH range is frequently $\geq 2$ and $\leq 5$. In the case of pH adjustment using bases it would, however, be possible to convert the catalyzing metal ions into low-solubility hydroxides or hydroxo complexes. In order to ensure sufficient concentrations of metal ions during the aftertreatment, therefore, it is advantageous to add complexing agents, such as ethylenediaminetetraacetic acid, nitrilotriacetic acid and diethylenetriaminepentaacetic acid and/or their respective sodium salts, for example, and/or to use stable metal ion complexes, such as, for example, iron-stable metal ion complexes, such as iorn(III)/sodium ethylenediaminetetraacetate, for example.

The method of the invention is particularly suitable for lowering the residual monomer amount in aqueous polymer dispersions obtainable by free-radical emulsion polymerization of monomers containing at least one ethylenically unsaturated group.

Monomers containing at least one monoethylenically unsaturated group that are suitable for the method of the invention include, in particular, monomers which can be free-radically polymerized simply, such as the olefins, for example. Ethylene, vinylaromatic monomers such as styrene, α-methylstyrene, o-chlorostyrene or vinyltoluenes, esters of vinyl alcohol and monocarboxylic acids containing 1 to 18 carbon atoms, such as vinyl acetate, vinyl propionate, vinyl n-butyrate, vinyl laurate, and vinyl stearate, esters of preferably $C_3$ to $C_6$ α,β-monoethylenically unsaturated monocarboxylic and dicarboxylic acids, such as in particular acrylic acid, methacrylic acid, maleic acid, fumaric acid, and itaconic acid, with generally $C_1$ to $C_{12}$, preferably $C_1$ to $C_8$, and in particular $C_1$ to $C_4$ alkanols such as, in particular, acrylic and methacrylic methyl, ethyl, n-butyl, isobutyl, and 2-ethylhexyl esters, dimethyl maleate or di-n-butyl maleate, nitriles of α,β-monoethylenically unsaturated carboxylic acids, such as acrylonitrile, and $C_{4-8}$ conjugated dienes such as 1,3-butadiene and isoprene. In the case of aqueous polymer dispersions produced exclusively by the method of free-radical aqueous emulsion polymerization these monomers generally form the principal monomers, which, based on the total amount of monomers to be polymerized by the method of free-radical aqueous emulsion polymerization, normally account for a fraction of more than 50% by weight. As a general rule these monomers have only a moderate to low solubility in water under standard conditions (25° C., 1 atm).

Monomers with a heightened solubility in water under the aforementioned conditions are, for example, α,β-monoethylenically unsaturated monocarboxylic and dicarboxylic acids and their amides, such as acrylic acid, methacrylic acid, maleic acid, fumaric acid, itaconic acid, acrylamide, and methacrylamide, for example, and also vinylsulfonic acid and the water-soluble salts thereof, and also N-vinylpyrrolidone.

In the case of aqueous polymer dispersions produced exclusively by the method of free-radical aqueous emulsion polymerization the abovementioned monomers exhibiting heightened solubility in water are normally copolymerized merely as modifying monomers in amounts, based on the total amount of monomers to be polymerized, of less than 50% by weight, generally from 0.5 to monomers to be polymerized, of less than 50% by weight, generally from 0.5 to 20% by weight, and preferably from 1 to 10% by weight.

Monomers which customarily increase the internal strength of the films formed from the aqueous polymer dispersions normally contain at least one epoxy, hydroxyl, N-methylol or carbonyl group, or have at least two nonconjugated ethylenically unsaturated double bonds. Examples thereof are N-alkylolamides of α,β-monoethylenically unsaturated carboxylic acids containing 3 to 10 carbon atoms, among which N-methylolacrylamide and N-methylolmethacrylamide are especially preferred, and also their esters with alkanols containing 1 to 4 carbon atoms. Also suitable are monomers containing two vinyl radicals, monomers containing two vinylidene radicals, and monomers containing two alkenyl radicals. Particularly advantageous here are the diesters of dihydric alcohols with α,β-monoethylenically unsaturated monocarboxylic acids, among which acrylic acid and methacrylic acid are preferred.

Examples of such monomers containing two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylates, and also divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular significance in this context are the $C_1$-$C_8$ hydroxyalkyl esters of methacrylic and acrylic acid, such as n-hydroxyethyl, n-hydroxypropyl or n-hydroxybutyl acrylate and methacrylate, and also compounds such as diacetoneacrylamide and acetylacetoxyethyl acrylate and methacrylate. In the case of aqueous polymer dispersions produced exclusively by the method of free-radical aqueous emulsion polymerization, the aforementioned monomers are copolymerized in amounts, based on the total amount of monomers to be polymerized, of generally from 0.5 to 10% by weight.

The preparation of aqueous polymer dispersions has been the subject of numerous prior descriptions and is therefore adequately known to the skilled worker [cf., e.g., Encyclopedia of Polymer Science and Engineering, Vol. 8, p. 659ff (1987); D. C. Blackley, in High Polymer Latices, Vol. 1, p. 35ff (1966); Emulsion Polymerisation, Interscience Publishers, New York (1965), and Dispersionen synthetischer Hochpolymerer, F. Hölscher, Springer-Verlag, Berlin (1969)]. It takes place by emulsion polymerization of monomers containing at least one ethylenically unsaturated group in the presence of a preferably water-soluble polymerization initiator and in the presence of emulsifiers and, where appropriate, protective colloids and further customary additives. The monomers are generally added here by means of continuous feed. As initiator it is preferred to use peroxodisulfuric acid and/or salts thereof in amounts of from 0.1 to 2% by weight, based on the total amount of the monomers. The polymerization temperature is generally from 20 to 150° C. and preferably from 60 to 120° C. The polymerization takes place where appropriate under superatmospheric pressure. Emulsifiers used, are, in particular, anionic emulsifiers, alone or in a mixture with nonionic dispersants, in an amount of in particular from 0.5 to 6% by weight of the total monomer amount.

The inventive aftertreatment of the aqueous polymer dispersion for reducing the residual monomer amount takes place in particular when at least 95% by weight but preferably at least 98 to 99% by weight of the total monomer amount has undergone conversion in the free-radical emulsion polymerization. The proportions in the case of the main polymerization and in the case of the aftertreatment are generally different. Thus during the main polymerization, with a high monomer concentration and with oligomer radicals which are growing and so becoming more and more hydrophobic, the entry of free radicals into the dispersion particles is easy, while in the case of the aftertreatment it is generally very difficult, owing to the low monomer concentration and the paucity of growing oligomer radicals. In the case of the preparation of aqueous polymer dispersions, therefore, it is generally necessary to have different initiator systems for the main polymerization and the aftertreatment.

Like processes of free-radical polymerization in general, the process of the invention too takes place usually under an inert gas atmosphere (e.g., nitrogen or argon).

It will be appreciated that it is possible to supply the aqueous polymer dispersions that are the subject of the aftertreatment to inert gas stripping and/or steam stripping, where the methyl ketones used for the reaction, in particular, can be separated off easily.

The initiator systems for use in accordance with the invention allow an effective lowering of residual monomer content within a relatively short time. An advantage is that the methyl ketones used are chemical compounds which are easy to obtain. Additionally the methyl ketones used to remove residual monomer can generally be removed from the aqueous polymer dispersions in a simple manner by inert gas and/or steam stripping. It is further of importance that the methyl ketone used in accordance with the invention generally does not interfere with the components of the aqueous polymer dispersions, and so the use thereof in excess does not detract from the quality of the aqueous polymer dispersion in this respect, even if it is not separated off by inert gas stripping and/or steam stripping after the aftertreatment. Another advantage is that, especially when using silver ions, the aqueous polymer dispersion is additionally protected against bacterial infestation and that therefore there is no need to add any other preservatives to the aqueous polymer dispersion, or else the amount to be added is considerably less.

EXAMPLES

Example 1

A styrene/n-butyl acrylate dispersion prepared by free-radical polymerization from 23 kg of styrene, 25 kg of n-butyl acrylate, 2 kg of acrylic acid, 1.2 kg of a 34% strength by weight aqueous styrene seed latex dispersion (particle size approximately 30 to 35 nm), 300 g of a 15% strength by weight solution of sodium lauryl sulfate in deionized water, 500 g of a 45% strength by weight solution of Dowfaxe® 2A1 (dodecylphenoxybenzenedisulfonic acid sodium salt) in deionized water, 300 g of a 25% strength by weight solution of sodium hydroxyde in deionized water, 150 g of a 36% strength by weight solution of sodium peroxodisulfate in deionized water and 46 kg of deionized water at 80° C., had a solids content of 52% by weight and a pH of 4.3.

In the aftertreatment 1500 g of this aqueous dispersion, cooled to 20 to 25° C. (room temperature), were introduced under a nitrogen atmosphere, and a 25% strength by weight solution of sodium hydroxide in deionized water was added until the pH was 6.5. Thereafter 2.0 g of a 1% strength by weight solution of silver nitrate in deionized water were added to the aqueous polymer dispersion and the resultant aqueous dispersion was heated to 90° C. Subsequently, with stirring, a) 25 g of a 23% strength by weight solution of sodium persulfate in deionized water and
b) 25 g of a 20% strength by weight solution of acetone in deionized water were metered into the aqueous polymer dispersion via two separate feeds, beginning simultaneously, at a feed rate of 12.5 g per hour in each case. Then reaction was allowed to take place at this temperature for a further hour. After that time the aqueous dispersion was cooled to room temperature and the amounts of residual monomer were measured. The resultant residual amounts of n-butyl acrylate and of styrene were determined by means of gas chromatography, the residues of acrylic acid by means of HPLC. The results obtained in the aftertreatment are shown in table 1.

TABLE 1

Residual monomer amounts of the aqueous polymer dispersion in the aftertreatment

| Time min | Styrene ppm | n-Butyl acrylate ppm | Acrylic acid ppm |
|---|---|---|---|
| 0 | 2930 | 13 150 | 3450 |
| 60 | 70 | 1900 | 1930 |
| 120 | 60 | 1200 | 940 |
| 180 | 60 | 990 | 890 |

Example 2

In the aftertreatment 1500 g of the aqueous dispersion, prepared in example 1, were introduced under a nitrogen atmosphere, and a 25% strength by weight solution of sodium hydroxide in deionized water was added at room temperature until the pH was 6.5, and the resultant aqueous dispersion was heated to 90° C. Subsequently, with stirring,
  a) 25 g of a 23% strength by weight solution of sodium persulfate in deionized water and
  b) 25 g of a 20% strength by weight solution of acetone in deionized water were metered into the aqueous polymer dispersion via two separate feeds, beginning simultaneously, at a feed rate of 12.5 g per hour in each case. Then reaction was allowed to take place at this temperature for a further hour. After that time the aqueous dispersion was cooled to room temperature and the amounts of residual monomer were measured. The results obtained through the aftertreatment are shown in table 2.

TABLE 2

Residual monomer amounts of the aqueous polymer dispersion in the aftertreatment

| Time min | Styrene ppm | n-Butyl acrylate ppm | Acrylic acid ppm |
|---|---|---|---|
| 0 | 2950 | 13 130 | 3410 |
| 60 | 570 | 2940 | 1970 |
| 120 | 260 | 1510 | 1040 |
| 180 | 100 | 1010 | 910 |

Comparative Example

In the aftertreatment 1500 g of the aqueous dispersion, prepared in example 1, were introduced under a nitrogen atmosphere, and a 25% strength by weight solution of sodium hydroxide in deionized water was added until the pH was 6.5, and the resultant aqueous dispersion was heated to 90° C. Subsequently, with stirring,
  a) 25 g of a 25% strength by weight solution of tert-butyl hydroperoxide in deionized water and
  b) 25 g of an aqueous solution consisting of 3.0 g of sodium bisulfite ($Na_2S_2O_5$), 2.0 g of acetone and 20 g of deionized water were metered into the aqueous polymer dispersion via two separate feeds, beginning simultaneously, at a feed rate of 12.5 g per hour in each case. Then reaction was allowed to take place at this temperature for a further hour. After that time the aqueous dispersion was cooled to room temperature and the amounts of residual monomer were measured. The results obtained through the aftertreatment are shown in table 3.

TABLE 3

Residual monomer amounts of the aqueous polymer dispersion in the aftertreatment

| Time min | Styrene ppm | n-Butyl acrylate ppm | Acrylic acid ppm |
|---|---|---|---|
| 0 | 2950 | 13 030 | 3410 |
| 60 | 940 | 3120 | 2140 |
| 120 | 170 | 1820 | 1230 |
| 180 | 110 | 1150 | 900 |

We claim:

1. A method for reducing an amount of residual monomer in an aqueous polymer dispersion, comprising:
  treating the aqueous polymer dispersion with an initiator system;
  wherein:
  the initiator system comprises:
   a) from 0.001 to 5% by weight, based on a total monomer amount used to prepare the polymer dispersion, of an inorganic salt of persulfuric acid;
   b) from 0.005 to 5% by weight, based on the total monomer amount used to prepare the polymer dispersion, of a methyl ketone; and
   c) optionally, catalytic amounts of at least one metal ion that is able to exist in a plurality of valence states; and
  the methyl ketone is a compound of the formula R1—C(═O)—CH$_3$, where R1 is:
   an unsubstituted $C_1$ to $C_5$ alkyl group;
   a $C_1$ to $C_5$ alkyl groups substituted with one or more functional groups selected from the group consisting of halogens and alkoxy groups —O—$R^2$, where $R^2$ is an unsubstituted $C_1$ to $C_5$ alkyl group; or
   an olefinically unsaturated group selected from the group consisting of 1-propenyl, 2-propenyl, isopropenyl, 1-butenyl, 2-butenyl, 3-butenyl, 1-methyl-1-propenyl, 1-methyl-2-propenyl, 2-methyl-1-propenyl, 2-methyl-1-propenyl, 1-pentenyl, 2-pentenyl, 3-pentenyl, 4-pentenyl, 1-methyl-1-butenyl, 1-methyl-2-butenyl, 1-methyl-3-butenyl, 2-methyl-1-butenyl, 2-methyl-2-butenyl, 2-methyl-3-butenyl, 3-methyl-1-butenyl, 3-methyl-2-butenyl, 3-methyl-3-butenyl, 1-ethyl-1-propenyl, 1-ethyl-2-propenyl, 2-ethyl-1-propyl-, 2-ethyl-2-propenyl, 1,2-dimethyl-1-propenyl, 1,2-dimethyl-2-propenyl, 1,1-dimethyl-1-propenyl and 2,2-dimethyl-1-propenyl groups.

2. A method as claimed in claim 1, wherein the inorganic salt of persulfuric acid comprises at least one member selected from the group consisting of a sodium salt, a potassium salt and an ammonium salt.

3. A method as claimed in claim 1, wherein treating the aqueous polymer dispersion with the initiator system comprises supplying the inorganic salt of persulfuric acid and the methyl ketone to the aqueous polymer dispersion simultaneously by way of separate feeds.

4. A method as claimed in claim 1, wherein:
  the initiator comprises the at least one metal ion; and
  a majority of the at least one metal ion is supplied to the aqueous polymer dispersion prior to supply of the inorganic salt of persulfuric acid and the methyl ketone.

5. A method as claimed in claim 1, wherein:
the initiator comprises the at least one metal ion; and
the at least one metal ion is present in an amount of from 1 to 1000 ppm based on the total monomer amount used to prepare the polymer dispersion.

6. A method as claimed in claim 1, wherein the metal ion comprises at least one member selected from the group consisting of iron ions, copper ions, manganese ions, vanadium ions, nickel ions, cobalt ions, titanium ions, cerium ions, chromium ions and silver ions.

7. A method as claimed in claim 1, wherein treating the aqueous polymer dispersion with the initiator system comprises treating in the presence of complexing agents.

8. A method as claimed in claim 1, wherein treating the aqueous polymer dispersion with an initiator system comprises treating while the aqueous polymer dispersion has a pH of from −2 to 10.

* * * * *